United States Patent
Lee

(10) Patent No.: US 9,591,252 B2
(45) Date of Patent: Mar. 7, 2017

(54) CURVED DISPLAY APPARATUS FOR PROVIDING REAR COMBINATION LAMP FUNCTION

(71) Applicant: Hyundai Motor Company, Seoul (KR)

(72) Inventor: Jong Bok Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 344 days.

(21) Appl. No.: 14/299,549

(22) Filed: Jun. 9, 2014

(65) Prior Publication Data

US 2015/0156448 A1 Jun. 4, 2015

(30) Foreign Application Priority Data

Dec. 2, 2013 (KR) ........................ 10-2013-0148733

(51) Int. Cl.
| | |
|---|---|
| *G03B 21/14* | (2006.01) |
| *H04N 5/74* | (2006.01) |
| *F21S 8/10* | (2006.01) |
| *B60Q 1/26* | (2006.01) |
| *G09F 19/18* | (2006.01) |
| *G09F 21/04* | (2006.01) |

(Continued)

(52) U.S. Cl.
CPC ......... *H04N 5/7458* (2013.01); *B60Q 1/2607* (2013.01); *F21S 48/214* (2013.01); *F21S 48/2212* (2013.01); *F21S 48/23* (2013.01); *G03B 21/14* (2013.01); *G09F 19/18* (2013.01); *G09F 21/04* (2013.01); *H04N 9/3129* (2013.01); *H04N 9/3185* (2013.01); *G02B 26/0833* (2013.01); *G02B 26/105* (2013.01)

(58) Field of Classification Search
CPC ..... H04N 5/7458; F21S 48/214; G06F 3/0421
USPC .............................. 353/12–14; 340/901–905
See application file for complete search history.

(56) References Cited

U.S. PATENT DOCUMENTS 4,697,879 A * 10/1987 Gerbe ................ G02B 27/0101
345/22
4,935,722 A * 6/1990 Pollack ................. B60Q 1/302
307/10.8

(Continued)

FOREIGN PATENT DOCUMENTS

| JP | 2002-234360 A | 8/2002 |
|---|---|---|
| KR | 20-0253662 Y1 | 10/2001 |

(Continued)

*Primary Examiner* — William C Dowling
(74) *Attorney, Agent, or Firm* — Mintz Levin Cohn Ferris Glovsky and Popeo, P.C.; Peter F. Corless

(57) ABSTRACT

A curved display apparatus and method for providing a rear combination lamp function are provided. The apparatus includes a laser scanning projector configured to project an image onto a predetermined projection area. A first reflection mirror is configured to reflect the image projected from the laser scanning projector and a second reflection mirror is configured to reflect the image reflected from the first reflection mirror. A curved screen displays the image reflected from the second reflection mirror. A controller is configured to receive data from a data detector that detects a running state, determine an image to be displayed on the curved screen from an image data list set in advance based on the received data, and operate the laser scanning projector based on the determined image.

17 Claims, 4 Drawing Sheets

(51) Int. Cl.
*H04N 9/31* (2006.01)
*G02B 26/08* (2006.01)
*G02B 26/10* (2006.01)

(56) References Cited

U.S. PATENT DOCUMENTS

| | | | | |
|---|---|---|---|---|
| 5,519,536 | A * | 5/1996 | Hoehn | B60K 35/00 |
| | | | | 353/13 |
| 6,124,647 | A * | 9/2000 | Marcus | B60C 23/0401 |
| | | | | 307/10.1 |
| 7,131,728 | B2 * | 11/2006 | Nambudiri | G02B 27/01 |
| | | | | 348/44 |
| 7,273,278 | B2 * | 9/2007 | Fronzek | B60K 35/00 |
| | | | | 345/9 |
| 8,465,154 | B2 * | 6/2013 | Kim | G03B 21/00 |
| | | | | 353/11 |
| 2008/0204666 | A1 * | 8/2008 | Spearman | G03B 21/28 |
| | | | | 353/37 |
| 2009/0195644 | A1 * | 8/2009 | Wakabayashi | G02B 26/085 |
| | | | | 348/51 |
| 2010/0302513 | A1 * | 12/2010 | Takahashi | G03B 33/12 |
| | | | | 353/33 |
| 2012/0306635 | A1 | 12/2012 | Sato | |
| 2013/0307706 | A1 * | 11/2013 | Kriezman | B60Q 1/503 |
| | | | | 340/988 |
| 2015/0156447 | A1 * | 6/2015 | Lee | H04N 5/7458 |
| | | | | 348/745 |

FOREIGN PATENT DOCUMENTS

| | | |
|---|---|---|
| KR | 10-2010-0078688 A | 7/2010 |
| KR | 10-2010-0093241 | 8/2010 |
| KR | 10-2013-0086956 A | 8/2013 |

\* cited by examiner

CURVED DISPLAY APPARATUS FOR PROVIDING REAR COMBINATION LAMP FUNCTION

CROSS-REFERENCE TO RELATED APPLICATION

This application claims priority to and the benefit of Korean Patent Application No. 10-2013-0148733 filed in the Korean Intellectual Property Office on Dec. 2, 2013, the entire contents of which are incorporated herein by reference.

BACKGROUND (a) Field of the Invention

The present invention relates to a curved display apparatus. More particularly, the present invention relates to a curved display apparatus for providing a rear combination lamp function.

(b) Description of the Related Art

Generally, head lamps, turn signal lamps, tail lamps, stop lamps, back-up lamps, and hazard lamps are mounted within a vehicle. A driver of the vehicle uses the lamps to indicate an intention to other drivers or pedestrians and to drive the vehicle in a dark area.

FIG. 1 is an exemplary drawing showing a rear portion of a vehicle where a conventional rear combination lamp is mounted. Referring to FIG. 1, turn signal lamps 6 represent a moving direction of the vehicle, tail lamps 7 represent a driving state of the vehicle, and back-up lamps 8 represent a reverse state of the vehicle. The tail lamps 7 are also used as stop lamps for representing a deceleration state or a stop state of the vehicle. By simultaneously turning on and off the turn signal lamps 6, the turn signal lamps 6 are also used as hazard lamps for representing a hazard state. The lamps integrally formed with the turn signal lamps 6, the tail lamps 7, the stop lamps, and the back-up lamps 8 are referred to as a "rear combination lamp 5." Generally, shapes of rear combinations lamps are determined according to vehicle types. Accordingly, it may be difficult to manufacture a rear combination lamp having a shape desired by a driver.

The above information disclosed in this Background section is merely for enhancement of understanding of the background of the invention and therefore it may contain information that does not form the prior art that is already known in this country to a person of ordinary skill in the art.

SUMMARY

The present invention provides a curved display apparatus for providing a rear combination lamp function having advantages of using a laser scanning projector instead of a plurality of lamps mounted at rear portions of a vehicle.

An exemplary embodiment of the present invention provides a curved display apparatus for providing a rear combination lamp function that may include: a laser scanning projector configured to project an image onto a predetermined projection area; a first reflection mirror configured to reflect the image projected from the laser scanning projector; a second reflection mirror configured to reflect the image reflected from the first reflection mirror; a curved screen configured to display the image reflected from the second reflection mirror; and a controller configured to receive data from a data detector that detects a running state, determine an image to be displayed on the curved screen from an image data list set in advance, based on the received data, and operate the laser scanning projector according to the determined image.

The first reflection mirror may be an aspherical mirror manufactured based on a curvature value of the curved screen. The controller may be configured to output timing of laser beams output from the laser scanning projector based on the curvature value of the curved screen. The image data list may further include a text image. The laser scanning projector may include a laser generator configured to output laser beams, a laser combiner configured to combine the laser beams projected from the laser generator, and a micro-opto-electromechanical system (MEMS) scanner configured to project the image onto the predetermined area by scanning the laser beams.

Further, the laser generator may include a red laser source configured to project a red laser beam, a green laser source configured to project a green laser beam, and a blue laser source configured to project a blue laser beam. The laser combiner may include a plurality of collimator lenses disposed in each of projecting directions of the laser beams projected from the laser generator, and a plurality of dichroic mirrors that correspond to each of the projection directions of the laser beams projected from the plurality of collimator lenses. The MEMS scanner may include a MEMS mirror scanning the laser beams.

The data detector may include a brake pedal position sensor configured to detect whether a brake pedal is pushed (e.g., engaged), a shift-speed sensor configured to detect a shift-speed that is currently engaged, a turn signal switch detector configured to detect whether a turn signal switch is turned on or off, and a hazard lamp switch detector configured to detect whether a hazard lamp switch is turned on or off.

As described above, according to the exemplary embodiment of the present invention, a rear combination lamp with a driver-desired design can be expressed. Further, the curved display apparatus may provide the rear combination lamp function even though the shape of the curved screen is changed, and thus there is no need to additionally manufacture a plurality of lamps according to vehicle type.

DESCRIPTION OF SYMBOLS

Figure 1:
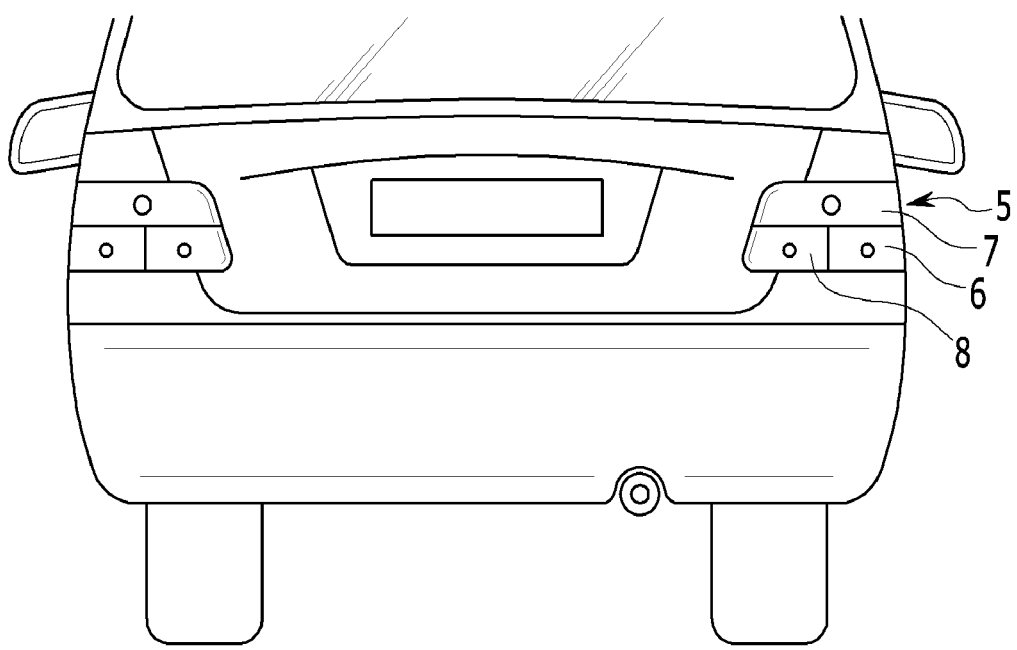
FIG. 1 is an exemplary drawing showing a rear portion of a vehicle where a conventional rear combination lamp is mounted according to the related art.

1: Vehicle
5: Rear combination lamp
10: Curved screen
20: Laser scanning projector
30: First reflection mirror
40: Second reflection mirror 50: Controller
60: Data detector
100: Curved display apparatus

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention. Further, since each component shown in the drawings is arbitrarily illustrated for easy description, the present invention is not particularly limited to the component illustrated in the drawings.

Figure 2:
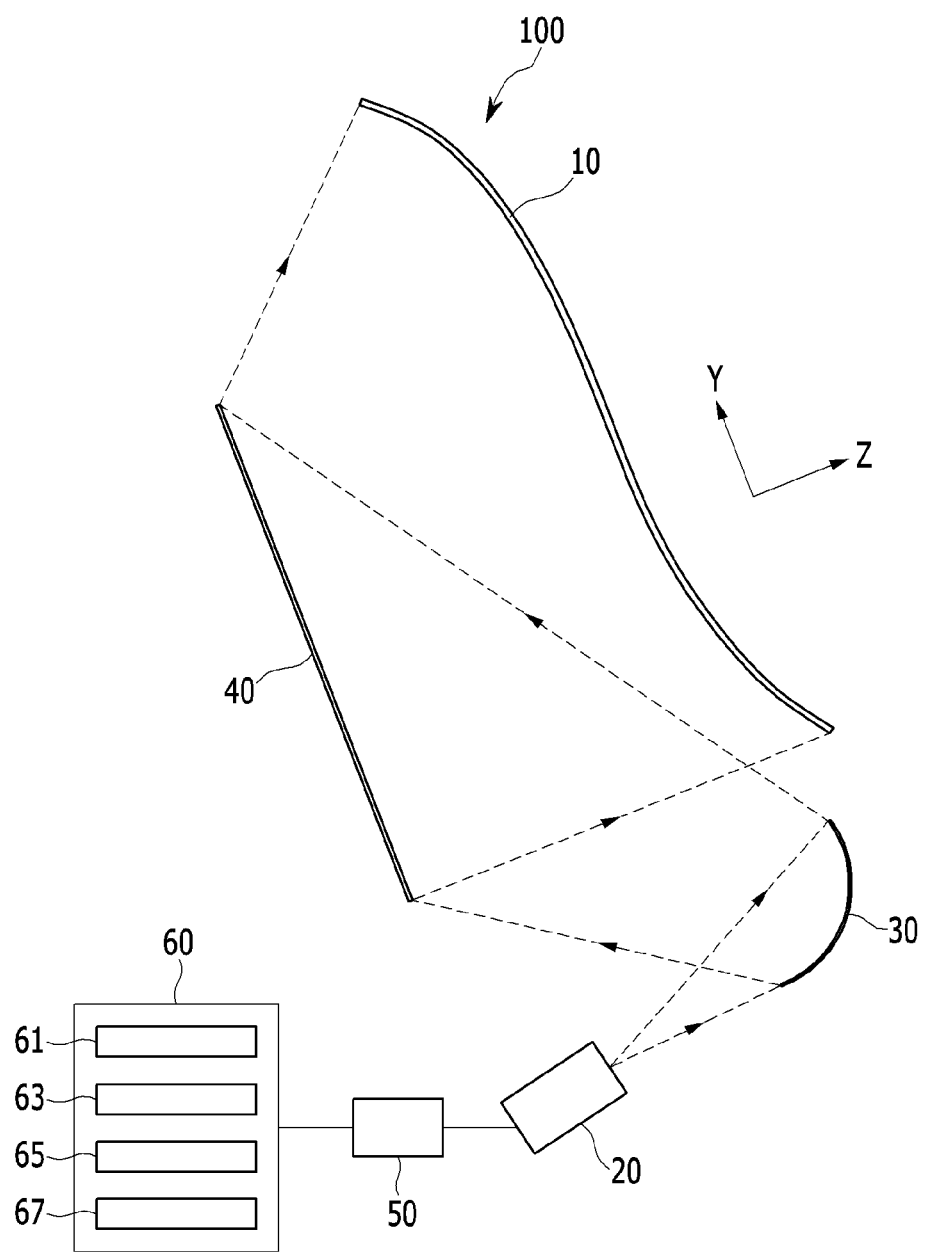
FIG. 2 is an exemplary schematic diagram of a curved display apparatus for providing a rear combination function according to an exemplary embodiment of the present invention.
Figure 3:
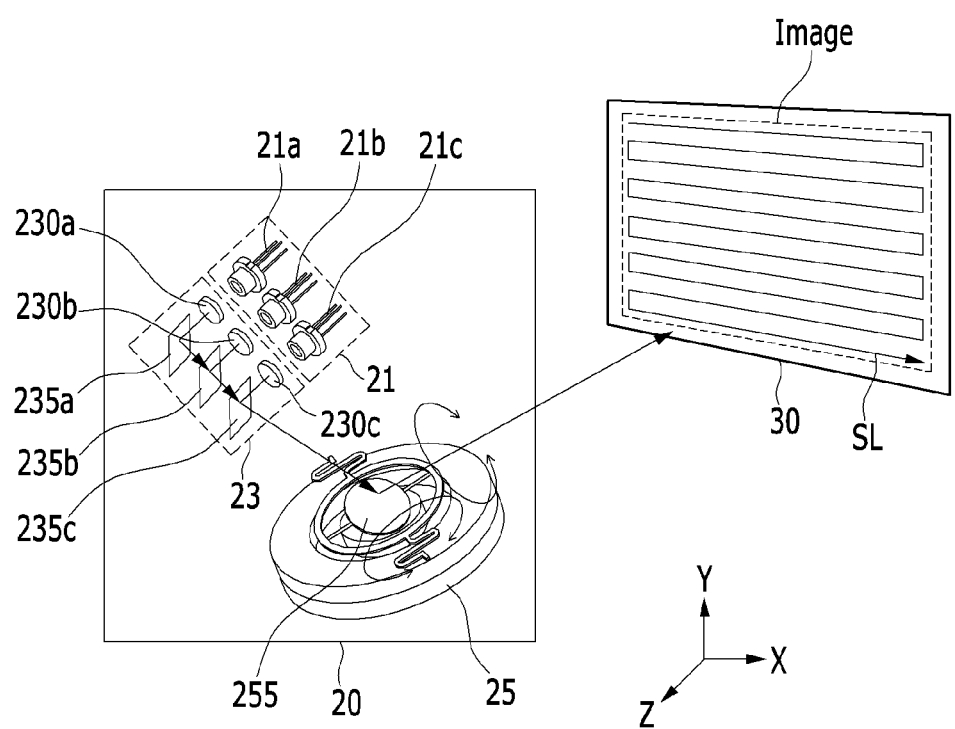
FIG. 3 is an exemplary schematic diagram of a laser scanning projector according to an exemplary embodiment of the present invention.

FIG. 2 is an exemplary schematic diagram of a curved display apparatus for providing a rear combination lamp function according to an exemplary embodiment of the present invention. FIG. 3 is an exemplary schematic diagram of a laser scanning projector according to an exemplary embodiment of the present invention. As shown in FIG. 2 and FIG. 3, a curved display apparatus 100 according to an exemplary embodiment of the present invention may include a curved screen 10, a laser scanning projector 20, a first reflection mirror 30, a second reflection mirror 40, and a controller 50. Throughout the specification, the axis of the horizontal direction of an image output from the laser scanning projector 20 is denoted as an x-axis, and the axis of the vertical direction of the image is denoted as a y-axis.

The curved display apparatus 100 may be disposed at a rear side of a vehicle according to an interior design of the vehicle. The curved screen 10 may be made of a transparent acryl material to display an image. The image may be projected from the laser scanning projector 20 onto the curved screen 10, and may be visually recognized by a viewer such as a driver or a pedestrian at a rear of the vehicle. The image may include a turn signal lamp image, a tail lamp image, a stop lamp image, a back-up lamp image, a hazard lamp image, and the like. The image may further include text. For example, the phrase "Emergency stop" may be simultaneously displayed while displaying the stop lamp image and the hazard lamp image.

Additionally, the laser scanning projector 20 may include a laser generator 21, a laser combiner 23, and a microelectromechanical systems (MEMS) scanner 25 all executed by the controller 50. The laser generator 21 may include a red laser source 21a configured to project a red laser beam, a green laser source 21b configured to project a green laser beam, and a blue laser source 21c configured to project a blue laser beam. Each of the red laser source 21a, the green laser source 21b, and the blue laser source 21c may be configured to project laser beams based on control signals output from the controller 50. Such different laser beams may be mixed to reproduce a variety of colors.

Furthermore, due to the high directionality, the laser beams may move in a substantially straight line and may not spread. When using the laser beams, it may be possible to achieve a substantially pure color of an intensive single wavelength even with substantially low power according to characteristics of the laser beam, compared to a conventional fluorescent lamp. Accordingly, images having improved quality may be provided regardless of a distance between the laser scanning projector 20 and the curved screen 10 since a focal point is not required to be matched.

The laser combiner 23 may be configured to combine laser beams projected from the laser generator 21. The laser combiner 23 may also be configured to transmit the laser beams output from the laser generator 21 to the MEMS scanner 25 via a single path. The laser combiner 23 may include a plurality of collimator lenses 230a, 230b, and 230c and a plurality of dichroic mirrors 235a, 235b, and 235c. The plurality of collimator lenses 230a, 230b, and 230c may be disposed in the projection direction of laser beams projected from the laser generator 21. Additionally, the plurality of collimator lenses 230a, 230b, and 230c may be configured to refract the laser beams to generate parallel laser beams.

A dichroic mirror may be configured to reflect laser beams of a specific frequency band, and pass laser beams of frequencies other than the specific frequency band. In particular, the dichroic mirror 235a that corresponds to the projection direction of the red laser source 21a may be configured to reflect laser beams of a red frequency band, and pass laser beams of frequencies other than the red frequency band (e.g., allow the beams to pass through the mirror instead of reflecting the beams). The dichroic mirror 235b that corresponds to the projection direction of the green laser source 21b may be configured to reflect laser beams of a green frequency band, and pass laser beams of frequencies other than the green frequency band. The dichroic mirror 235c that corresponds to the projection direction of the blue laser source 21c may be configured to reflect laser beams of a blue frequency band, and pass laser beams of frequencies other than the blue frequency band. Each of the dichroic mirrors 235a, 235b, and 235c may be configured to reflect laser beams toward the MEMS scanner 25.

The MEMS scanner 25 may include an MEMS mirror 255 configured to scan laser beams along the x-axis direction and the y-axis direction, and a driving portion (not shown) connected with the controller 50. The driving portion may be configured to rotate the MEMS mirror 255 with the respect the x-axis or the y-axis based on driving signals output from the controller 50. The MEMS mirror 255 may be configured to project images onto a predetermined projection area by scanning laser beams. The controller 50 may be connected to the laser generator 21 and the MEMS scanner 25, and may be implemented with one or more microprocessors executed by a predetermined program. The predetermined program may include a series of commands for performing each step included in a method for controlling the laser scanning projector 20 to display images according to an exemplary embodiment of the present invention.

According to a running state detected by a data detector 60, the controller 50 may be configured to determine an image to be displayed on the curved screen 10 from an image data list set in advance (e.g., a stored image data list). The image data list may include the turn signal lamp image, the tail lamp image, the stop lamp image, the back-up lamp image, and the hazard lamp image. The image data list may further include a text image.

The data detector 60 executed by the controller 50, may include a brake pedal position sensor 61, a shift-speed sensor 63, a turn signal switch detector 65, and a hazard lamp switch detector 67. The brake pedal position sensor 61 may be configured to detect whether a brake pedal is engaged. In other words, the brake pedal position sensor 61 may be configured to detect the driver's deceleration intention. The shift-speed sensor 63 may be configured to detect a shift-speed currently engaged. The turn signal switch detector 65 may be configured to detect whether a turn signal switch is turned on or off. The hazard lamp switch detector 67 may be configured to detect whether a hazard lamp switch is turned on or off.

It may be sufficient in an exemplary embodiment of the present invention for the data detector 60 to provide information regarding the operation of the brake pedal, information regarding the shift-speed, information regarding the operation of the turn signal switch, and information regarding the operation of the hazard lamp switch to the controller 50. Therefore, it may be understood that the data detector 60 may include any device which can provide the information regarding the operation of the brake pedal, information regarding the shift-speed, information regarding the operation of the turn signal switch, and information regarding the operation of the hazard lamp switch to the controller 50 in this specification and the claims.

The controller 50 may be configured to output control signals to each of the laser sources 21a, 21b, and 21c to blink laser beams. The controller 50 may also be configured to output the driving signals to the MEMS scanner 25 to adjust the direction of laser beams reflected by the MEMS mirror 255, to cause the laser beams to form a scanning line SL. The controller 50 may be configured to operate the laser scanning projector 20 to project laser beams, which may form an image on the reflection surface of the first reflection mirror 30. In particular, each pixel of the image may be formed on the reflection surface of the first reflection mirror 30 by scanning the blinked laser beams. One frame time (i.e., the time taken for the MEMS mirror 255 to return to the original position when laser beams are sequentially scanned according to the sequential scanning technique) may be about 1/60 of a second, but is not limited thereto.

An image formed on the first reflection mirror 30 may be reflected toward the second reflection mirror 40. The second reflection mirror 40 may be configured to reflect laser beams reflected from the first reflection mirror 30 toward the curved screen 10. The first reflection mirror 30 may be an aspherical mirror manufactured based on the curvature value of the curved screen 10. Additionally, when the first reflection mirror 30 is a plane mirror, the controller 50 may be configured to adjust output timing of laser beams output from the laser scanning projector 20 based on the shape of the curved screen 10. In other words, the controller 50 may be configured to adjust the direction of the laser beams scanned by the MEMS mirror 255 based on the curvature value of the curved screen 10. Accordingly, the image formed on the curved screen 10 may be displayed to the viewer such as the driver or the pedestrian at the rear side of the vehicle without distortion. In addition, by using the first reflection mirror 30, the path depth of a laser beam required for displaying an image on the curved screen 10 may be adjusted to reduce the size of the curved display apparatus 100.

Figure 4:
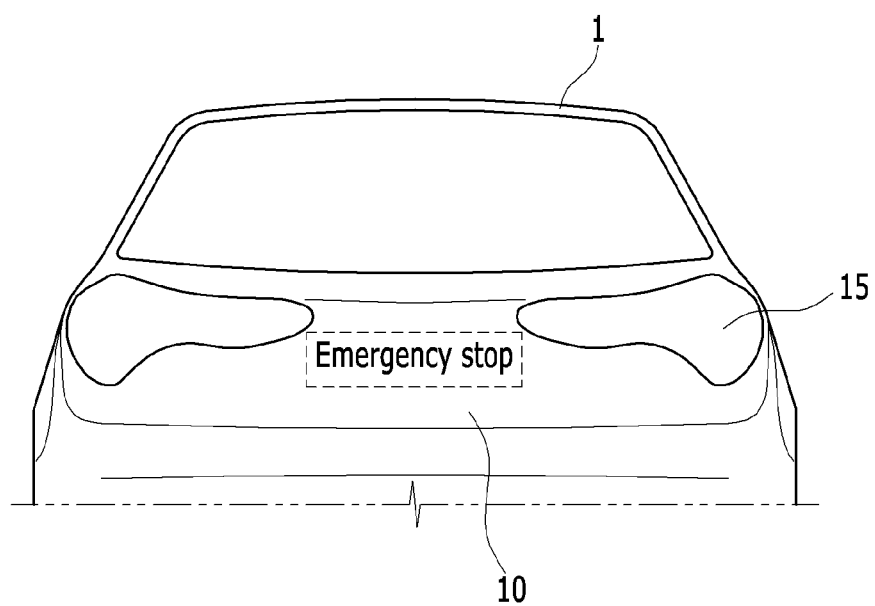
FIG. 4 is an exemplary drawing showing a rear portion of a vehicle where a curved display apparatus for providing a rear combination lamp function according to an exemplary embodiment of the present invention is mounted.

FIG. 4 is an exemplary drawing showing a rear portion of a vehicle where a curved display apparatus for providing a rear combination lamp function according to an exemplary embodiment of the present invention is mounted. As shown in FIG. 4, when the brake pedal is engaged, a stop lamp image 15 may be projected onto the curved screen 10 disposed at the rear side of a vehicle 1. The controller 50 may be configured to operate the laser scanning projector 20 based on the data transmitted from the data detector 60 to display the turn signal lamp image, the tail lamp image, the back-up lamp image, the hazard lamp image, and the text image on the curved screen 10.

As described above, according to the exemplary embodiment of the present invention, a rear combination lamp with a driver-desired design may be expressed. Further, the curved display apparatus 100 may provide the rear combination lamp function even though the shape of the curved screen 10 is changed, and thus there is no need to additionally manufacture a plurality of lamps according to different vehicle types.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the accompanying claims.

What is claimed is:

1. A curved display apparatus for providing a rear combination lamp function, the apparatus comprising:

a laser scanning projector configured to project an image onto a predetermined projection area;

a first reflection mirror configured to reflect the image projected from the laser scanning projector;

a second reflection mirror configured to reflect the image reflected from the first reflection mirror;

a curved screen configured to display the image reflected from the second reflection mirror and disposed at a rear side of a vehicle; and a controller configured to receive data from a data detector that detects a state of the vehicle, determine an image to be displayed on the curved screen from an image data list based on the received data, and operate the laser scanning projector according to the determined image, wherein the image data list includes at least one of a turn signal lamp image, a tail lamp image, a stop lamp image, a back-up lamp image, and a hazard lamp image.

2. The curved display apparatus of claim 1, wherein the first reflection mirror is an aspherical mirror manufactured based on a curvature value of the curved screen.

3. The curved display apparatus of claim 1, wherein the controller is configured to adjust output timing of laser beams output from the laser scanning projector based on the curvature value of the curved screen.

4. The curved display apparatus of claim 1, wherein the image data list further includes a text image.

5. The curved display apparatus of claim 1, wherein the laser scanning projector comprises:

a laser generator configured to output laser beams;

a laser combiner configured to combine the laser beams projected from the laser generator; and a micro-opto-electromechanical system (MEMS) scanner configured to project the image onto the predetermined projection area by scanning the laser beams.

6. The curved display apparatus of claim 5, wherein the laser generator includes:

a red laser source configured to project a red laser beam;

a green laser source configured to project a green laser beam; and a blue laser source configured to project a blue laser beam.

7. The curved display apparatus of claim 5, wherein the laser combiner includes:

a plurality of collimator lenses disposed in each of projecting directions of the laser beams projected from the laser generator; and a plurality of dichroic mirrors that correspond to each of the projection directions of the laser beams projected from the plurality of collimator lenses.

8. The curved display apparatus of claim 5, wherein the MEMS scanner includes a MEMS mirror configured to scan the laser beams.

9. The curved display apparatus of claim 1, wherein the data detector includes:

a brake pedal position sensor configured to detect whether a brake pedal is engaged;

a shift-speed sensor configured to detect a shift-speed currently engaged;

a turn signal switch detector configured to detect whether a turn signal switch is turned on or off; and a hazard lamp switch detector configured to detect whether a hazard lamp switch is turned on or off.

10. A curved display method for providing a rear combination lamp function, the method comprising:

projecting, by a laser scanning projector, an image onto a predetermined projection area;

receiving, by a controller, data from a data detector that detects a state of a vehicle;

determining, by the controller, an image to be displayed on a curved screen from an image data list based on the received data, wherein the curved screen is disposed at a rear side of the vehicle; and operating, by the controller, the laser scanning projector according to the determined image, wherein the image data list includes at least one of a turn signal lamp image, a tail lamp image, a stop lamp image, a back-up lamp image, and a hazard lamp image.

11. The curved display method of claim 10, further comprising:

adjusting, by the controller, output timing of laser beams output from the laser scanning projector based on the curvature value of the curved screen.

12. The curved display method of claim 10, wherein the image data list further includes a text image.

13. The curved display method of claim 10, further comprising:

outputting, by the controller, laser beams;

combining, by the controller, the laser beams projected from the laser generator; and projecting, by the controller, the image onto the predetermined projection area by scanning the laser beams.

14. A non-transitory computer readable medium containing program instructions executed by a controller, the computer readable medium comprising:

program instructions that project an image onto a predetermined projection area using a laser scanning projector;

program instructions that receive data from a data detector that detects a state of a vehicle;

program instructions that determine an image to be displayed on a curved screen from an image data list based on the received data, wherein the curved screen is disposed at a rear side of the vehicle; and program instructions that operate the laser scanning projector according to the determined image, wherein the image data list includes at least one of a turn signal lamp image, a tail lamp image, a stop lamp image, a back-up lamp image, and a hazard lamp image.

15. The non-transitory computer readable medium of claim 14, further comprising:

program instructions that adjust output timing of laser beams output from the laser scanning projector based on the curvature value of the curved screen.

16. The non-transitory computer readable medium of claim 14, wherein the image data list further includes a text image.

17. The non-transitory computer readable medium of claim 14, further comprising:

program instructions that output laser beams;

program instructions that output the laser beams projected from the laser generator; and program instructions that project the image onto the predetermined projection area by scanning the laser beams.

* * * * *